United States Patent [19]

Nevo et al.

[11] Patent Number: 5,371,790
[45] Date of Patent: Dec. 6, 1994

[54] TELEPHONE WITH RESILIENT HOUSING

[76] Inventors: Itzchak Nevo, Shats St 7, Tel-Aviv; Gideon Yeshaya, Ben-Gurion St 173, Ramat Gan 52383, both of Israel

[21] Appl. No.: 923,846

[22] Filed: Jul. 31, 1992

[51] Int. Cl.5 .................................................. H04M 1/00
[52] U.S. Cl. ............................................. 379/433; 379/428
[58] Field of Search ............... 379/428, 433, 434, 437, 379/451, 455; D14/143, 147

[56] References Cited

U.S. PATENT DOCUMENTS

| | | | |
|---|---|---|---|
| D. 301,237 | 5/1989 | Falcone | D14/143 |
| D. 301,577 | 6/1989 | Morrison et al. | D14/143 |
| D. 302,693 | 8/1989 | Leblen | D14/147 |
| D. 303,387 | 9/1989 | Leblen | D14/147 |
| D. 338,470 | 8/1993 | Clayton . | |
| 2,039,625 | 5/1936 | Blount | 379/433 |
| 2,098,402 | 11/1937 | Reifsteck et al. . | |
| 2,123,177 | 7/1938 | Blount . | |
| 2,226,959 | 12/1940 | Zimmerman . | |
| 2,720,332 | 10/1955 | Holt . | |
| 3,564,164 | 2/1971 | Prescott . | |
| 4,501,936 | 2/1985 | Morse | 379/451 |
| 4,736,411 | 4/1988 | Chan . | |
| 4,736,418 | 4/1988 | Steadman . | |
| 4,762,227 | 8/1988 | Patterson . | |
| 4,782,527 | 11/1988 | Williamson . | |
| 4,866,765 | 9/1989 | Yang . | |
| 5,012,513 | 4/1991 | Dale . | |
| 5,042,071 | 8/1991 | Stinauer . | |
| 5,123,044 | 6/1992 | Tate . | |

FOREIGN PATENT DOCUMENTS

| | | |
|---|---|---|
| 0260523 | 9/1987 | European Pat. Off. . |
| 0399176 | 3/1990 | European Pat. Off. . |
| 160790 | 10/1990 | Germany . |
| 2190562 | 11/1987 | United Kingdom . |
| WO2803958 | 11/1982 | WIPO ................ 379/451 |

OTHER PUBLICATIONS

Gifts & Decorative Accessories, Article Dec. 1987.
Plastics Design Forum, Article, Sep./Oct. 1986.
15 Patent Abstracts of Japan No. 191 Mar. 1991.
JP-A-03 050 940 of Matsushita Electric.

*Primary Examiner*—James L. Dwyer
*Assistant Examiner*—Jack Chiang
*Attorney, Agent, or Firm*—Schweitzer Cornman & Gross

[57] ABSTRACT

A telephone construction utilizes foam as the body material. The housing may be formed from layers of foam built up in a manner to provide a central cavity for the electromechanical components of the telephone. An upper foam surface covers the dial pushbutton matrix to provide a smooth number-entry keypad. The foam may be utilized to provide a wide variety of shapes and appearances for the housing.

5 Claims, 3 Drawing Sheets

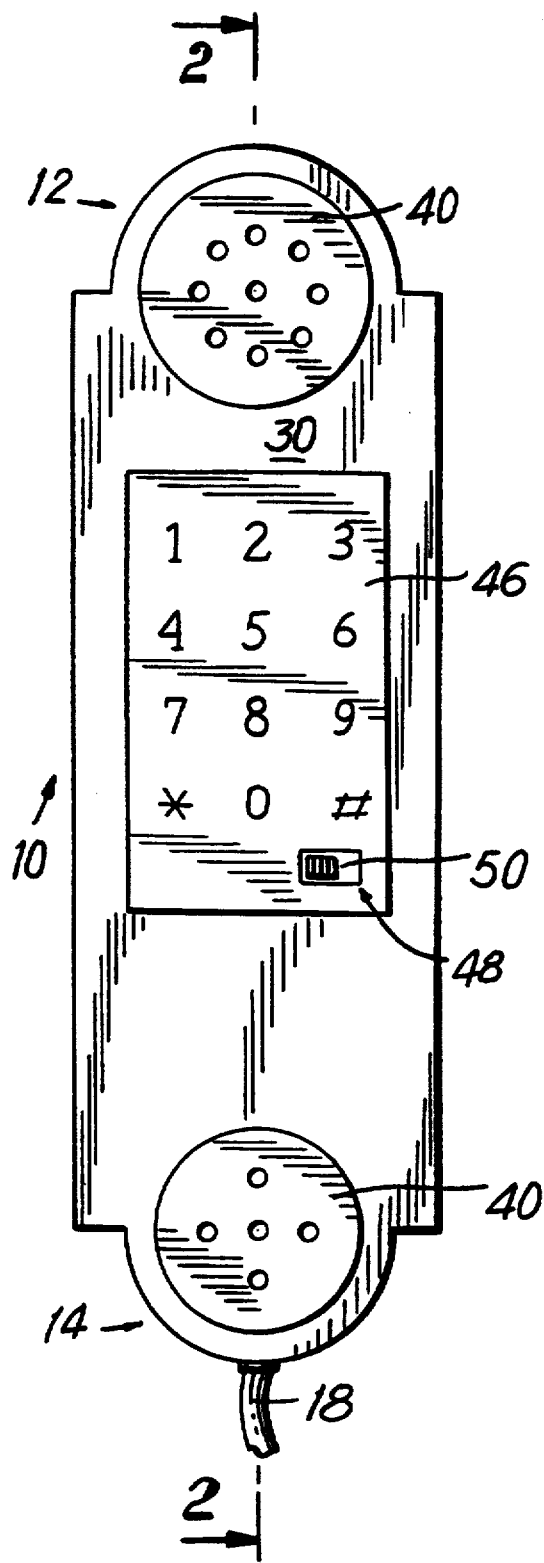
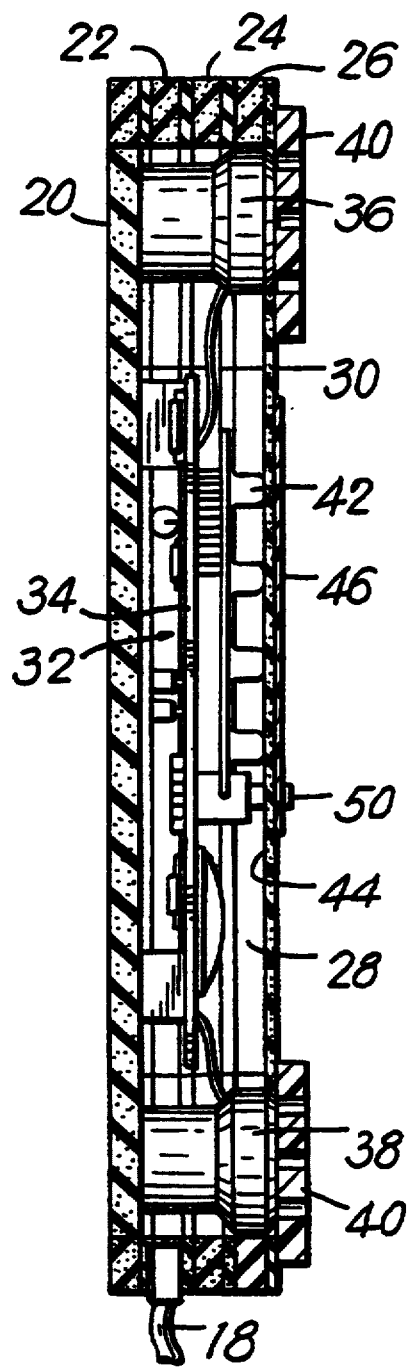

TELEPHONE WITH RESILIENT HOUSING

The present invention relates to a new and improved electrical device, and, in particular, to a telephone.

BACKGROUND OF THE INVENTION

Conventional methods of construction for telephone instruments typically result in instruments having a standard appearance. Because of continued developments in circuit design, it has become possible to condense the electronics required for telephone instrument into a compact volume. While this has eliminated a major prior constraint in telephone design, the use of the conventional constructions has not allowed full advantage to be taken of the flexibility afforded by advantages in electronics. It is thus a purpose of the present invention to provide a telephone construction which allows telephone instruments to be configured in a wide variety of external appearances, and which has a construction which is but novel, inexpensive to fabricate, and which provides a unique appearance and feel to the instrument.

BRIEF DESCRIPTION OF THE INVENTION

The present invention comprises a pushbutton telephone housing of a sturdy but resilient material in the nature of a rigid foam formed into an housing enclosure for the electromechanical components of the telephone. In a preferred embodiment, the top wall of the housing constitutes the pushbutton dial matrix, while in another embodiment discrete button elements may project through the upper surface. The housing may be formed in a two piece construction, the sides and bottom wall being formed as a first element having an interior cavity into which the electromechanical elements are placed. A top wall element is then bonded to the first element.

The housing may alternatively be constructed in layers. The layered construction allows materials having different, although compatible, characteristics to be combined in an advantageous manner, without departing from the overall form of construction. In the layered version an inner cavity is again created to house the electromechanical components.

The electromechanical elements within the housing may be placed directly within the cavity, or may alternatively be enclosed within a rigid enclosure, which enclosure is in turn embraced and supported within the cavity.

The present invention provides a telephone of light weight, rugged design, with the capability of being configured in a wide variety of exterior appearances whereby a wide variety of visual effects can be accomplished through utilization of a common structural configuration.

BRIEF DESCRIPTION OF THE DRAWINGS

A fuller understanding of the present invention will be accomplished upon review of the following detailed description of preferred, but nonetheless, illustrative embodiments thereof, when considered in conjunction with the annexed drawings, wherein FIG. 1 is a top plan view of a telephone constructed in accordance with the present invention;

FIG. 2 is a side elevation view taken along line 2—2 of FIG. 1;

DETAILED DESCRIPTION OF THE INVENTION

Figures 3, 4:
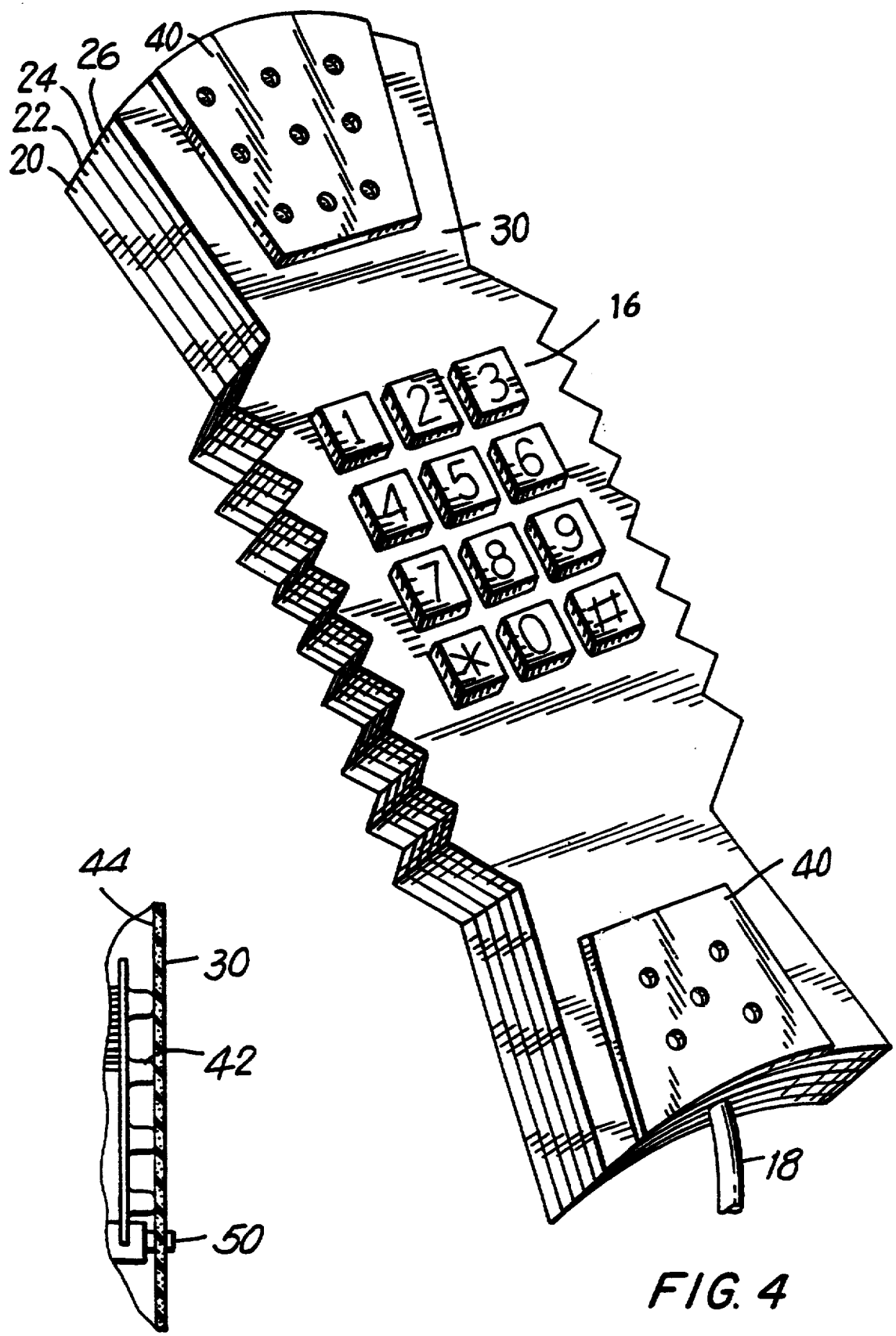
FIG. 3 is a detail section view of the dial area of the present invention.
FIG. 4 is a perspective view of an alternative embodiment of a telephone in accordance with the present invention.

Referring to FIGS. 1 through 3, a telephone of the present invention may be of generally conventional overall dimensions and comprises a generally rectangular, elongated housing 10 having an earpiece-defining portion 12 at one end and a mouthpiece-defining portion 14 at the other end. Located in the central part of the housing is dial pushbutton matrix 16. A multiconductor cable 18 runs from the exterior of the housing and allows interconnection between the phone and a telephone system as known in the art.

In contradistinction to the construction of conventional telephone instruments, the housing 10 is not formed of a rigid plastic or the like, but is rather formed of a closed cell foam product, such as an ethylene vinyl acetate (eva) copolymer composition. As seen in FIG. 2, the housing 10 may be formed of a plurality of laminations or layers of such foam material, the bottom wall 20 of the housing constituting a first layer, while subsequent intermediate layers, represented by elements 22, 24 and 26, may be in the form of a frame-like construction having a peripheral border surrounding a central aperture. When stacked in register with each other, the frame elements provide the side walls for the housing, while developing an inner cavity 28 into which the electromechanical components are placed.

Top layer 30 comprises the top wall of the telephone, and seals the cavity. The lamination may be joined into the resulting block form by sonic welding, adhesive, or other appropriate means as known in the art. Each of the layers may be of the same or different thicknesses, and can be otherwise individualized to produce a variety of external appearances, while maintaining an internal cavity of standard configuration for the included components. As seen in FIG. 4, for example, the exterior of the telephone may be highly individualized, the ability of the constructional elements to be die-cut or otherwise fabricated as desired providing substantial flexibility to the designer. Each layer may be separately colored as well in accordance with the desired visual appearance.

An electromechanical module 32 is mounted within the cavity 28 and is connected to cable 18, which enters the housing through an aperture in a side wall and which terminates at its distal exterior end in a jack or connector as know in the art. In a preferred embodiment, the individual module components are mounted to a printed circuit board 34, as known in the art, the board encircling and being supported at its opposed ends by speaker 36 and microphone 38 extending through appropriately dimensioned apertures in the board. It is to be recognized that the heights of the speaker and microphone are made compatible with the depth of the cavity 28. The speaker and microphone elements may be attached to bottom wall layer 20 by adhesive or the like to insure that the module is maintained in position. The top wall layer 30 may be provided with one or more apertures in alignment with the speaker and microphone to facilitate the transfer of sonic energy. The speaker and microphone covering portions of the top wall may be provided with a pair of overlying, similarly perforated elements 40, 40.

The module 32 includes a matrix of pushbutton elements 42, activation of which provides tone or pulse signals for dialing and other purposes as known in the art. These pushbutton elements 42, which may be of conventional construction, are positioned in the cavity such that the tops thereof are in contact with the lower surface 44 of top wall layer 30, as shown in FIG. 3. Because of the resilient nature of the top wall layer, finger pressure on the layer at a point above a pushbutton allows depression of the button to be accomplished, whereby dialing and other actions may be performed. Because the top wall layer 30 is integral and continuous in the central area of the housing where the pushbuttons are arrayed, such a construction provides a dust and moisture-resistant seal of the pushbutton elements from the environment while providing a novel construction and appearance.

Appropriate indicia identifying the position of the overlaid pushbuttons may be applied directly to the outer surface of top wall layer 30 or, alternatively, may be provided on a thin overlying layer 46 positioned appropriately upon the top layer 30. This layer 46 may itself be formed of foam, or may be of any other appropriate, flexible material, such as plastic, metalized plastic, fabric or the like. An aperture 48 may be provided through the top layer and dial layer 46, if utilized, for a slide switch 50, commonly used, for example, to switch between tone and pulse dialing or to silence a ringer, as known in the art. Alternatively, slide switch 50 may be replaced with a push-action toggle switch positioned similarly to the pushbuttons of the matrix, which would avoid the necessity for any aperture through the top wall.

In a presently contemplated embodiment switch 50 is to be used to replicate the switching which occurs upon lifting of a conventional handset from the cradle, thus allowing the telephone to set or hand in any orientation.

Figure 5:
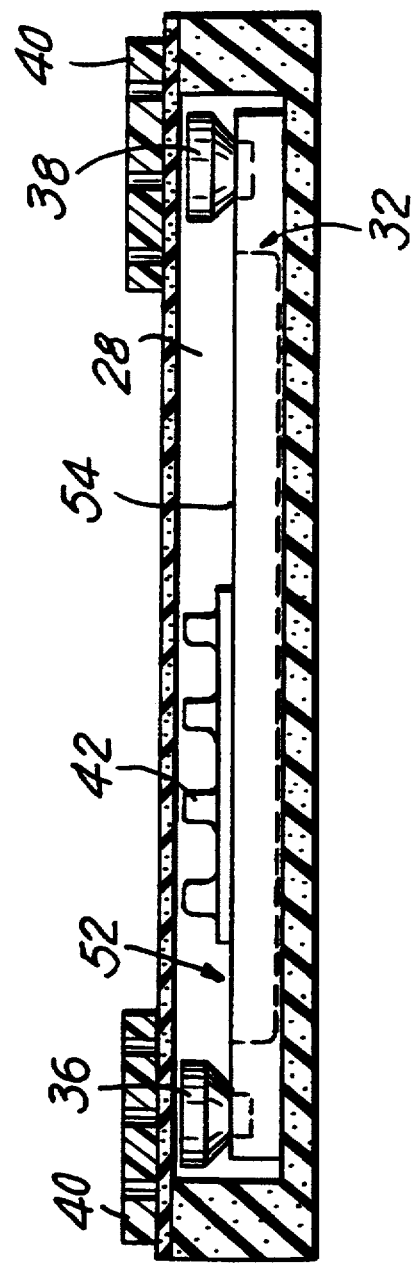
FIG. 5 is a sectional elevation view of an embodiment of the invention in which The electromechanical components are placed within a sub-housing.

In an alternative embodiment, as depicted in FIG. 5, the module 32 may be encased in sub-housing 52. The speaker and microphone elements 36, 38 may be totally external to the sub-housing or, alternatively as shown, may be mounted to or within the sub-housing in manners known in the art. Pushbutton matrix 42 projects through top surface 54 of the sub-housing. Typically, the sub-housing may be made of a light but rigid material, such as plastic. The dimensions of the sub-housing 52 are chosen such that the sub-housing fits snugly within cavity 28, the pushbutton matrix 42 being aligned with the button indicia appearing on the exterior of the housing. Sub-housing 52 may be in frictional fit contact with the sides of the cavity, shown in the figure as being formed out of a foam block, or may be further positioned and retained by the use of an appropriate adhesive or other fastening. Use of the sub-housing provides yet additional protection for the module 32, while allowing the flexibility afforded by the present construction to be maintained.

We claim:

1. A telephone, comprising a housing formed of a block of foam material having top and bottom walls; an electromechanical module having a dial pushbutton matrix of individual pushbuttons, each of said pushbuttons having a top activating surface; an earphone and a microphone electrically connected to said module; a cavity within said block adapted to accept said module, earphone and microphone; said top wall of said block overlying said cavity, said module and earphone and microphone, said top wall having means for allowing operation of to said pushbutton matrix and having apertures aligned with said microphone and earphone for the transmission of sounds to said microphone and from said earphone respectively; and first and second blocks mounted to said top wall overlying said apertures for said microphone and earphone, respectively, said blocks having apertures therethrough to transmit sounds between said microphone and earphone and a user.

2. The apparatus of claim 1, wherein said block is formed of a plurality of foam layers, an exterior one of said layers forming said top wall.

3. The apparatus of claim 1, wherein said top wall is of a resilient construction and said pushbutton top surfaces are oriented proximate an inner surface of said top wall whereby pressure on said top wall at a position overlying one of said top activating surfaces permits activation of the corresponding pushbutton.

4. The apparatus of claim 1 or 2 further comprising a second housing for mounting said module, microphone and earphone, said second housing being dimensioned and adapted to fit within said cavity.

5. The apparatus of claim 3 further comprising a planar flexible layer mounted to said top wall in register with said matrix and extending between said first and second blocks, said planar layer bearing indicia identifying the position of said top activating surfaces below said top wall.

* * * * *